(12) United States Patent
Kimmel (10) Patent No.: US 10,359,622 B2
(45) Date of Patent: Jul. 23, 2019

(54) ELECTRONIC CIRCUITRY FOR A VALVE FOR THE TRANSFER OF AN OPTICALLY-ACTIVE FLUID FROM A FIRST TO A SECOND RESERVOIR

(71) Applicant: Nokia Technologies Oy, Espoo (FI)

(72) Inventor: Jyrki Kimmel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/578,283

(22) PCT Filed: May 31, 2016

(86) PCT No.: PCT/FI2016/050379
§ 371 (c)(1),
(2) Date: Nov. 30, 2017

(87) PCT Pub. No.: WO2016/198736
PCT Pub. Date: Dec. 15, 2016

(65) Prior Publication Data
US 2018/0143423 A1 May 24, 2018

(30) Foreign Application Priority Data

Jun. 9, 2015 (EP) .................................... 15171083

(51) Int. Cl.
*F16K 99/00* (2006.01)
*G02B 26/00* (2006.01)
*F16K 31/02* (2006.01)

(52) U.S. Cl.
CPC ............ *G02B 26/004* (2013.01); *F16K 31/02* (2013.01); *F16K 31/025* (2013.01); *F16K 99/0017* (2013.01); *F16K 99/0036* (2013.01); *F16K 99/0042* (2013.01); *F16K 99/0049* (2013.01); *F16K 2099/0082* (2013.01)

(58) Field of Classification Search
CPC ............... G02B 26/004; F16K 99/0049; F16K 99/0017; F16K 99/0042; F16K 99/0036; F16K 99/0082; F16K 31/02; F16K 31/025
See application file for complete search history.

(56) References Cited

U.S. PATENT DOCUMENTS

| 2003/0156953 A1* | 8/2003 | Chinn | F04B 17/00 417/322 |
|---|---|---|---|
| 2007/0188882 A1* | 8/2007 | Cernasov | G02B 3/0056 359/659 |
| 2008/0094448 A1* | 4/2008 | Sugahara | B41J 2/16505 347/55 |
| 2008/0214412 A1* | 9/2008 | Stahler | B01J 19/0046 506/30 |

(Continued)

FOREIGN PATENT DOCUMENTS

| JP | 2008266407 A | 11/2008 |
|---|---|---|
| WO | WO 2006/044458 A2 | 4/2006 |

(Continued)

*Primary Examiner* — Matthew W Jellett
(74) *Attorney, Agent, or Firm* — Harrington & Smith (57) ABSTRACT

A transfer circuitry, e.g. in a display system, electrically generating a transfer-gradient along which an optically-active fluid is transferred via a valve from a first reservoir to a second reservoir and a valve-control circuitry providing a voltage to change the valve's shape from a first shape when it is closed to a second shape when it is open.

14 Claims, 7 Drawing Sheets

(56) References Cited

U.S. PATENT DOCUMENTS

2012/0180894 A1     7/2012   Sugahara ...................... 137/827
2014/0355101 A1*   12/2014   Shian ...................... G02B 3/12
                                                                                                                   359/290

FOREIGN PATENT DOCUMENTS

WO     WO 2013/087804 A1    6/2013
WO     WO-2013080676 A1    6/2013
WO     WO 2013/112498 A1    8/2013

\* cited by examiner

ELECTRONIC CIRCUITRY FOR A VALVE FOR THE TRANSFER OF AN OPTICALLY-ACTIVE FLUID FROM A FIRST TO A SECOND RESERVOIR

TECHNOLOGICAL FIELD

Embodiments of the present invention relate to an apparatus and/or method for controlling transfer of an optically active fluid from a first reservoir to a second reservoir.

BACKGROUND

In some applications, it may be desirable to control the transfer of an optically active fluid from a first reservoir to a second reservoir. Example applications where such transfer may be desirable are adjustable optical elements such as lenses, electronic displays, electronic paper and optical switches.

BRIEF SUMMARY

According to various, but not necessarily all, embodiments of the invention there is provided an apparatus comprising: transfer circuitry configured to generate electrically a first transfer gradient for transferring an optically active fluid from a first reservoir to a second reservoir; a valve configured to control transfer of the optically active fluid from the first reservoir to the second reservoir, wherein the valve is closed when it has a first shape and the valve is open when it has a second shape different to the first shape; and valve control circuitry configured to provide a voltage to change the valve from the first shape to the second shape and open the valve facilitating transfer of the optically active fluid from the first reservoir to the second reservoir along the electrically generated first transfer gradient.

According to various, but not necessarily all, embodiments of the invention there is provided a method comprising: providing one or more voltages to generate a first transfer gradient for transferring an optically active fluid from a first reservoir to a second reservoir and to open a valve to facilitate transfer of the optically active fluid from the first reservoir to the second reservoir along the electrically generated first transfer gradient, wherein the valve is closed when it has a first shape and the valve is open when it has a second shape different to the first shape; and removing the one or more voltages to remove the first transfer gradient and close the valve.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which.

DETAILED DESCRIPTION

In some applications, it may be desirable to control the transfer of an optically active fluid from a first reservoir to a second reservoir. Example applications where such transfer may be desirable are adjustable optical elements such as lenses, electronic displays, electronic paper and optical switches.

It is also desirable if the apparatus is a bistable or multistable apparatus such that energy is required to change a state of the apparatus but is not required to maintain the state of the apparatus.

A state of the apparatus may in some but not necessarily all examples be an operational state of the apparatus—a change in operational state results in a change in operation of the apparatus.

A state of the apparatus may in some but not necessarily all examples be an energy state of the apparatus—a change in energy state results in a change in an energy value, for example the Gibbs energy value, of the apparatus.

If a state is stable, small changes or perturbations will not result in a change in the state of the apparatus.

A stable state as regards a certain parameter may be represented as a local minimum in an energy diagram that plots energy against different values of that parameter. An unstable state as regards that parameter may be represented as any point in the energy diagram that is not a local minimum.

Embodiments of the present invention use a valve to provide this stability. The valve is in a closed condition when unactuated and is in an open condition when actuated. When a transfer gradient is generated for transferring the optically active fluid from the first reservoir to the second reservoir, the valve is placed in the open condition.

A transfer gradient may be conceptualized as a derivative of a function, for example energy, that can cause transfer with respect to one or more spatial dimensions. A transfer gradient creates a force that acts to transfer the optically active fluid from one location to another.

A reservoir is a place where the optically active fluid is collected or accumulated. A reservoir may be any receptacle, chamber, cavity, or other arrangement suitable for holding fluid. Two different reservoirs, such as the first reservoir and the second reservoir, separately collect or accumulate the optically active fluid and the same portion of optically active fluid cannot be simultaneously in the first reservoir and the second reservoir. However, optically active fluid may be transferred between the first reservoir and the second reservoir.

The open valve facilitates transfer of the optically activated fluid from the first reservoir to the second reservoir along the generated first transfer gradient. When the valve is then unactuated, it prevents further transfer of the optically active fluid between the first reservoir and the second reservoir. The valve therefore consumes energy during the transfer process but does not consume energy once the transfer process has been completed and the valve is deactivated.

The figures below illustrate an apparatus 10 comprising: transfer circuitry 20 configured to generate electrically a first transfer gradient 22 for transferring an optically active fluid 30 from a first reservoir 40 to a second reservoir 42; a valve 50 configured to control transfer of the optically active fluid 30 from the first reservoir 40 to the second reservoir 42, wherein the valve 50 is closed 58 when it has a first shape 56 and the valve 50 is open 54 when it has a second shape 52 different to the first shape 56; and valve control circuitry 60 configured to provide a first voltage to change the valve 50 from the first shape 56 to the second shape 52 and open 54 the valve 50 facilitating transfer of the optically active fluid 30 from the first reservoir 40 to the second reservoir 42 along the electrically generated first transfer gradient 22.

A transfer gradient creates a force that acts to transfer the optically active fluid from one location to another. Electrical generation of a transfer gradient connotes the use of electricity to generate a transfer gradient. The force that acts to transfer the optically active fluid from one location to another is not necessarily electrical, although it may be. The force that acts to transfer the optically active fluid from one location to another is controlled electrically.

The valve 50 may be configured to have, by default, the first shape 56 such that it is closed 58 when unactuated. The valve 50 is therefore in a stable, low energy configuration, when it is in the first shape 56 and closed 58 and is in an unstable higher energy configuration when it is in the second shape 52 and open 54.

A stable, low energy configuration, is a physical configuration that has a stable, low energy state. An unstable higher energy configuration is a physical configuration that has an unstable higher energy state.

The shape of a valve refers to the specific volume it occupies in three dimensions. The first shape 56 and the second shape 52 may occupy different sized volumes or may occupy the same sized volumes. If the first shape 56 and the second shape 52 occupy the same sized volumes (or different volumes), the volumes will (or may) be distributed differently in three dimensional space.

In some but not necessarily all examples, the valve 50 has only two configurations—the low energy configuration and the high energy configuration. In other examples, the valve 50 has multiple different configurations or a continuum of different configurations—including the low energy configuration and the high energy configuration.

Removal of the first voltage provided by the valve control circuitry 60 results in the valve 50 automatically changing from the second shape 52 to the first shape 56. The valve 50 consequently closes inhibiting transfer of the optically active fluid 30 when the valve control circuitry 60 stops providing the first voltage. The valve control circuitry 60 is configured to provide the first voltage for a first duration to maintain the valve 50 in the second shape 52 and open 54 for the first duration.

In this example but not necessarily all examples, the valve 50 is an electro-actuated valve which is actuated by a controlling electrical signal provided by the valve control circuitry 60. The valve 50 is not actuated by a generated transfer gradient.

The valve 50 may be an electromechanical valve. For example, it may comprise an electromechanical gel that changes shape when subjected to a potential difference. The electromechanical gel may be a low viscosity gel. It may, for example, comprise polysiloxane.

FIGS. 1A, 1B, 1C and 1D illustrate an apparatus 10 comprising a first reservoir 40 for the optically active fluid 30, a second reservoir 42 for the optically active fluid 30 and a conduit 44 between the first and second reservoirs 40, 42. The conduit 44 provides a route by which the optically active fluid 30 may be transferred between the first reservoir 40 and the second reservoir 42.

A valve 50 controls the flow of the optically active fluid through the conduit 44. The conduit 44 is blocked when the valve 50 has a first shape 56 and the conduit is not blocked when the valve has the second shape 52.

Figure 1A:
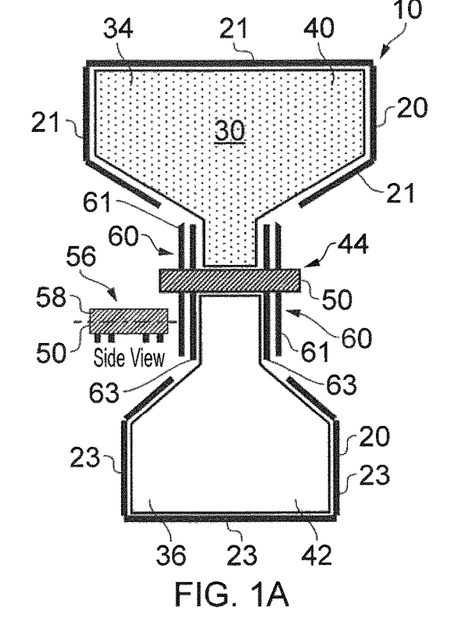
FIGS. 1A, 1B, 1C and 1D illustrate an example of an apparatus comprising an optically active fluid.
Figure 1B:
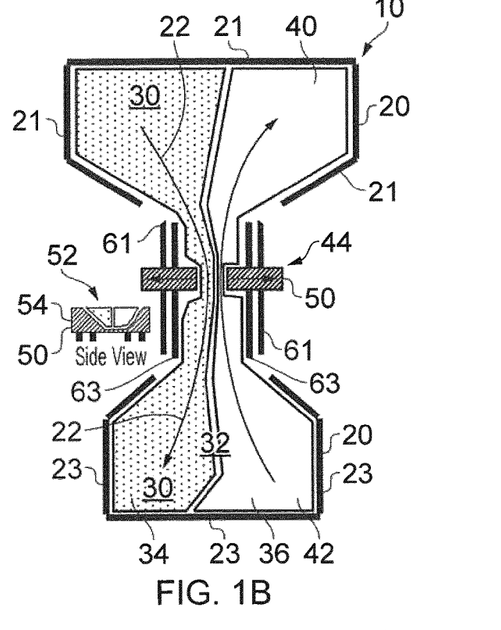

Transfer circuitry 20 is configured to generate electrically a first transfer gradient 22 for transferring the optically active fluid 30 between reservoirs, for example from the first reservoir 40 to the second reservoir 42 (see FIG. 1B). The valve 50 is configured to control transfer of the optically active fluid 30 from the first reservoir 40 to the second reservoir 42. The valve 50 is closed 58 when it has the first shape 56 and the valve 50 is open 54 when it has the second shape 52 different to the first shape 56.

Valve control circuitry 60 is configured to provide a first voltage to change the valve 50 from the first shape 56 to the second shape 52 and open 54 the valve facilitating transfer of the optically active fluid 30 from the first reservoir 40 to the second reservoir 42 along the electrically generated first transfer gradient 22 (see FIG. 1B).

Figure 1C:
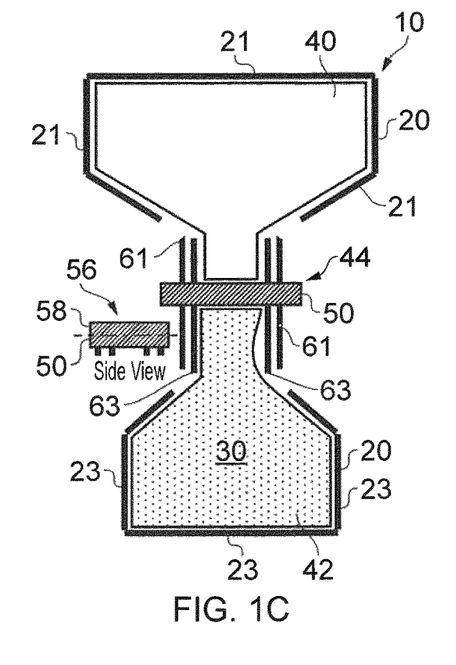

When the valve control circuitry 60 stops providing the first voltage, the valve 50 automatically changes from the second shape 52 to the first shape 56 and closes 58 inhibiting transfer of the optically active fluid 30 (see FIG. 1C).

Figure 1D:
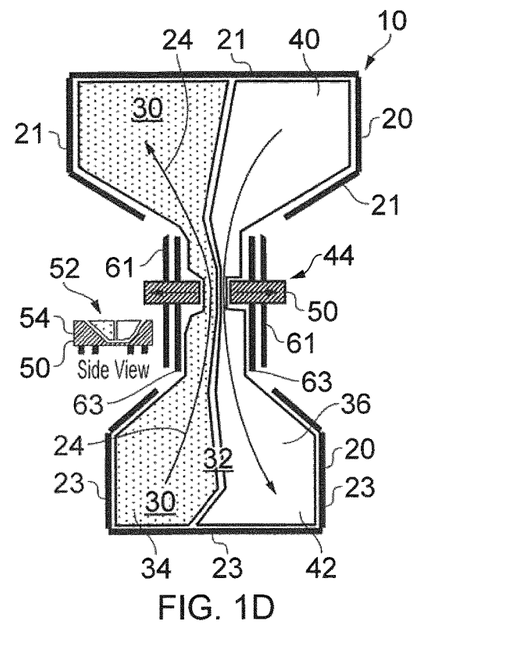

The transfer circuitry 20 is also configured to generate electrically a second transfer gradient 24 for transferring the optically active fluid 30 from the second reservoir 42 to the first reservoir 40 (see FIG. 1D). The valve 50 is configured to control transfer of the optically active fluid 30 from the second reservoir 42 to the first reservoir 40. The valve control circuitry 60 is configured to provide a second voltage to change the valve 50 from the first shape 56 to the second shape 52 and open 54 the valve 50 facilitating transfer of the optically active fluid 30 between reservoirs, for example, from the second reservoir 42 to the first reservoir 40 along the electrically generated second transfer gradient 24 (see FIG. 1D).

The first voltage and the second voltage may be the same value. The first voltage and the second voltage may be different values.

When the valve control circuitry 60 stops providing the second voltage, the valve 50 automatically changes from the second shape 52 to the first shape 56 and closes 58 inhibiting transfer of the optically active fluid 30.

From the foregoing it will therefore be appreciated that the apparatus 10 has two stable states as illustrated in FIG. 1A and FIG. 1C. In FIG. 1A, the optically active fluid 30 is retained in only the first reservoir 40 by the valve 50 which is in the first shape 56 and closed 58. In FIG. 1C, the optically active fluid 30 is retained in only the second reservoir 42 by the valve 50 which is in the first shape 56 and closed 58.

In FIGS. 1A to 1D, the valve 50 is located in the conduit 44 and each of the FIGS. 1A to 1D illustrate a cross sectional view of the valve 50. In FIGS. 1A and 1C, the valve blocks the conduit 44 and in FIGS. 1B and 1D the valve 50, in the second shape 52, provides an open passage through the conduit 44.

In this example, the first reservoir 40, the second reservoir 42 and the conduit 44 form a sealed system for the optically active fluid 30. A sealed system is a system that conserves the quality of optically active fluid 30. The optically active fluid 30 is therefore in only one of three places—the first reservoir 40, the second reservoir 42 and the conduit 44. The sealed system may be of fixed shape and volume. There are, in this example, no additional reservoirs other than the first reservoir 40 and the second reservoir 42.

In this example, the sealed system comprises a mixture 32 of immiscible liquids. One or both of the immiscible liquids is an optically active fluid 30. In the examples of FIGS. 1A to 1D, a first immiscible liquid 34 is an optically active fluid 30. The second immiscible liquid 36 of the mixture 32 may, or may not be an optically active fluid.

In this example, the first immiscible liquid 34 and the second immiscible liquid 36 have different optical properties and are mixed together in the same volume defined by the sealed system.

The first immiscible liquid 34 and the second immiscible liquid 36 may have contrastingly different optical properties. For example they may have different colors, they may have different optical absorption, they may have different refractive indices. For example one of the immiscible liquids may be black, while the other of the immiscible liquids may be clear or white.

The immiscible liquids may also have different characteristics. For example one of the immiscible liquids may be hydrophobic while the other may be hydrophilic. For example one of the immiscible liquids may have a high dielectric permittivity while the other may have a low dielectric permittivity.

The use of immiscible liquids with different hydrophilic/hydrophobic properties may enable electrowetting. Electrowetting is a modification of the wetting properties of a surface with an applied electric field. The surface liquid contact angle changes due to applied potential difference. The generated first transfer gradient 22 and/or the generated second transfer gradient 24 may be produced using electrowetting by changing the applied electric field at the surface of the first reservoir 40 and/or at the surface of the second reservoir 42. In this example, the surface of the first reservoir 40 and/or the second reservoir 42 may comprise a suitable electrowetting material such as an amorphous fluoropolymer.

Where the different immiscible liquids have different dielectric permittivities, then they will be subjected to different force values in the presence of the same electric field because of different Gibbs energy values, for example, associated with the capacitive (charge storage) effects of the liquids. One of the immiscible fluids will therefore be drawn in one direction in preference to the other immiscible fluid and will occupy one of the reservoirs. The other immiscible fluid will be displaced from that reservoir.

It will be appreciated from FIGS. 1A to 1D, that the valve control circuitry 60 may comprise first valve electrodes 61 associated with the conduit 44 and second valve electrodes 63 also associated with the conduit 44.

The first valve electrodes 61 and the second valve electrodes 63 form pairs of electrodes. Each pair of electrodes comprises a first valve electrode 61 and a second valve electrode 63 which are arranged in an overlapping configuration and separated by a gap. Each pair of electrodes therefore forms a parallel capacitor. As illustrated in FIGS. 2A, 2B and 3A, 3B, the valve control circuitry 60 may also comprise a voltage generator circuitry 64 configured to generate a voltage 62 between the first valve electrode 61 and the second valve electrode 63 in each pair of electrodes. The electric field that is generated between the first valve electrode 61 and the second valve electrode 63 of each pair of electrodes is perpendicular to the first transfer gradient 22 and the second transfer gradient 24. This electric field deforms an electromechanical gel 70 to the second shape 52, opening the valve 50. The electromechanical gel 70 is preferentially drawn towards adjacent portions of sidewalls 46 of the conduit 44 creating a fluid passage 72 through the conduit 44 (see FIGS. 2B and 3B). When the electric field between the first valve electrode 61 and the second valve electrode 63 of the pairs of electrodes is removed, the electromechanical gel 70 returns to its stable configuration and adopts the first shape 56, closing 58 the valve 50 (see FIGS. 2A and 3A).

Figure 2A:
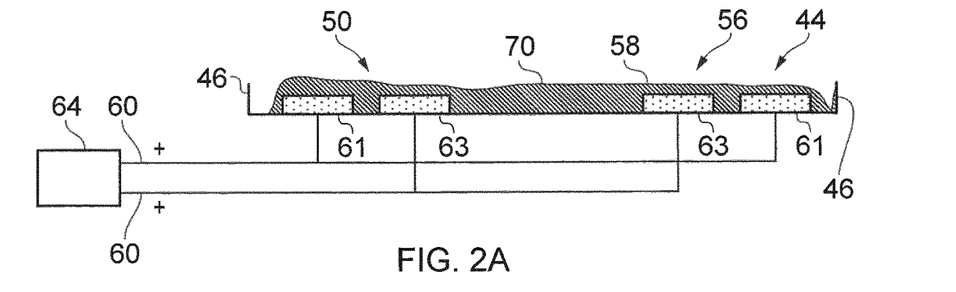
FIGS. 2A, 2B and 3A, 3B illustrate an example of valve control circuitry for controlling the flow of the optically active fluid.
Figure 2B:
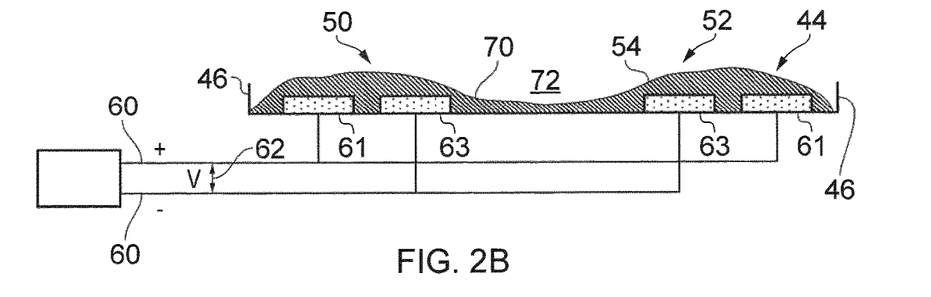
Figure 3A:
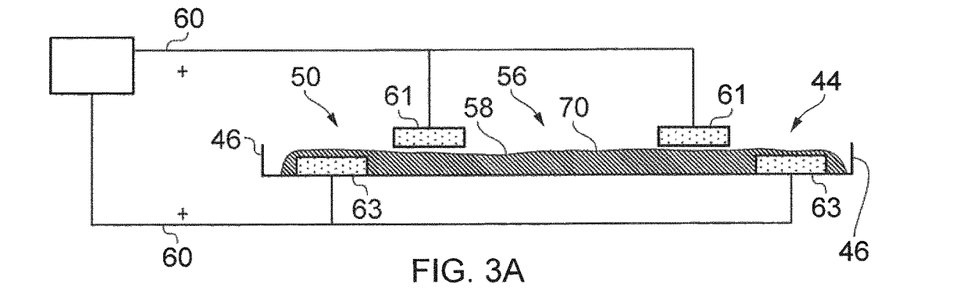
Figure 3B:
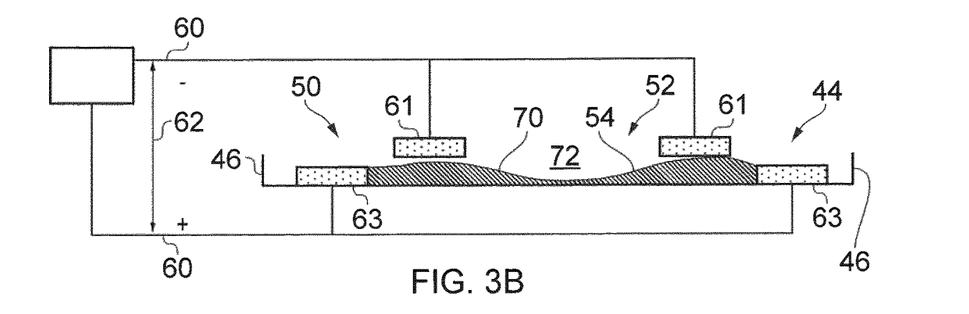

In FIGS. 2A, and 2B, the first valve electrode 61 and the second valve electrode 63 of a pair of electrodes lie in the same plane. In FIGS. 3A and 3B, the first valve electrode 61 and the second valve electrode 63 of a pair of electrodes lie in different planes. In both of the examples, the valve control circuitry 60 comprises a first pair of overlapping first and second valve electrodes 61, 63 adjacent a first sidewall 46 of the conduit 44 and a second pair of overlapping first and second valve electrodes 61, 63 adjacent a second sidewall 46 of the conduit 44, where the first and second sidewalls of the conduit are opposing across the conduit 44. The first pair of valve electrodes comprises a first valve electrode 61 and a second valve electrode 63 separated from the first valve electrode 61 in a direction perpendicular to the first/second transfer gradients 22/24. The second pair of valve electrodes comprises a first valve electrode 61 and a second valve electrode 63 separated from the first valve electrode 61 in a direction perpendicular to the first/second transfer gradients 22/24.

In the illustrated examples, the order of the first valve electrode 61 and the second valve electrode 63 for each of the pairs of electrodes is the same. However, in other examples the order may be reversed for one or both of the pairs.

Referring back to FIGS. 1A to 1D, the apparatus 10 may have a maximum dimension of less than ten micrometers and the first and the second valve electrodes 61, 63 may have a maximum dimension of less than one micrometer. Of course, other dimensions are possible.

The transfer circuitry 20 comprises a first transfer electrode 21 associated with the first reservoir 40, a second transfer electrode 23 associated with the second reservoir 42 and voltage generation circuitry 64 configured to generate a voltage 62 of a first polarity between the first and second transfer electrodes 21, 23 to generate electrically the first transfer gradient 22 and configured to generate a voltage 62 of a second polarity, opposite the first polarity, between the first and second transfer electrodes 21, 23 to generate electrically a second transfer gradient 24, opposite the first transfer gradient 22. FIG. 1B illustrates the generation of the first transfer gradient 22 using the first and second transfer electrodes 21, 23 and FIG. 1D illustrates the generation of the second transfer gradient 24 using the first and second transfer electrodes 21, 23.

Figure 4A:
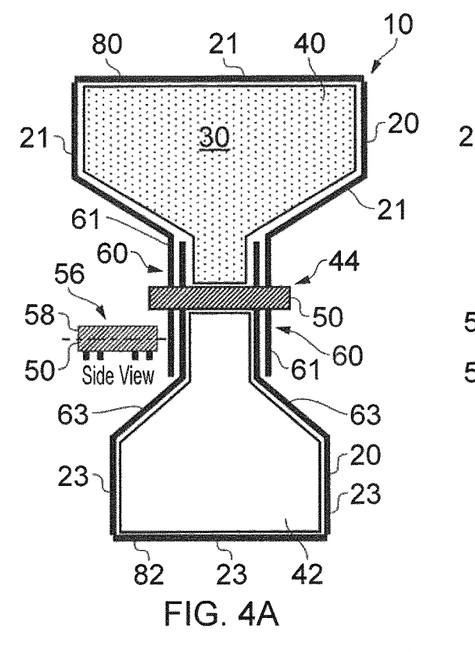
FIGS. 4A to 4D illustrate an example of an apparatus comprising optically active fluid with common valve control circuitry and transfer circuitry.
Figure 4B:
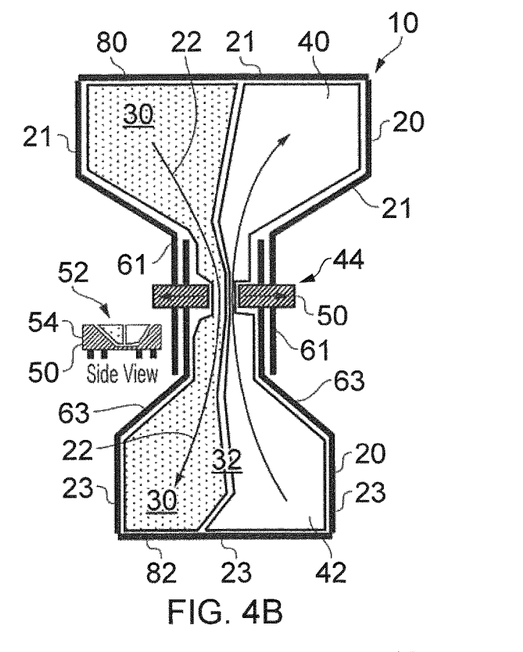
Figure 4C:
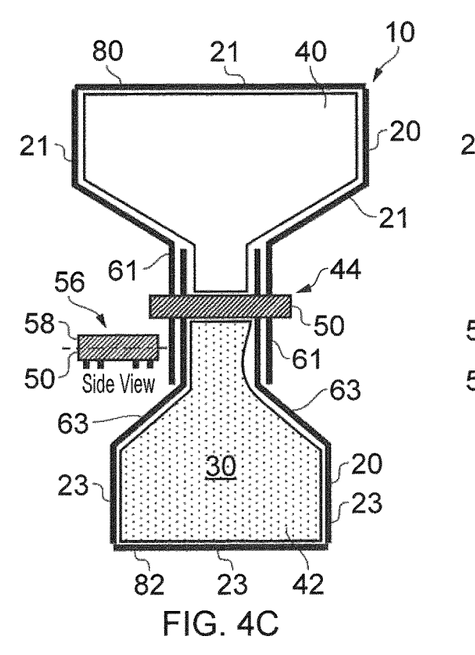
Figure 4D:
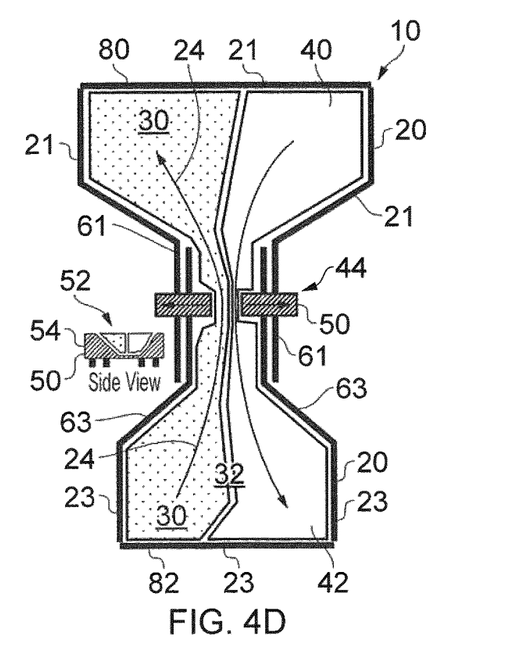

It will consequently be understood, that there is provided a method comprising:
  providing one or more first transfer voltages 62 to generate a first transfer gradient 22 for transferring an optically active fluid 30 from a first reservoir 40 to a second reservoir 42 and to open 54 a valve 50 to facilitate transfer of the optically active fluid 30 from the first reservoir 40 to the second reservoir 42 along the electrically generated first transfer gradient 22, wherein the valve 50 is closed 58 when it has a first shape 56 and the valve 50 is open 54 when it has a second shape 52 different to the first shape 56 (see FIG. 4B);

removing the one or more first transfer voltages 62 to remove the first transfer gradient 22 and to close 58 the valve 50 (FIG. 4C);

providing one or more second transfer voltages 62 to generate a second transfer gradient 24 for transferring the optically active fluid 30 from the second reservoir 42 to the first reservoir 40 and to open 54 the valve 50 to facilitate transfer of the optically active fluid 30 from the second reservoir 42 to the first reservoir 40 along the electrically generated second transfer gradient 24, wherein the valve 50 is closed when it has a first shape 56 and the valve 50 is open when it has the second shape 52 different to the first shape 56 (FIG. 4D); and removing the one or more second transfer voltages 62 to remove the second transfer gradient 24 and to close 58 the valve 50 (FIG. 4A).

In the example illustrated in FIGS. 1A to 1D, the transfer circuitry 20 and the valve control circuitry 60 operate independently. It is therefore possible to separate the timing of generation of the transfer gradients and the opening/closing of the valve 50 by the valve control circuitry 60. It is therefore possible for the transfer gradient generation and the valve opening to be synchronous or asynchronous.

FIGS. 4A to 4D illustrate examples of the apparatus as previously described with reference to FIGS. 1A to 1D (and also FIGS. 2A to 2B and 3A to 3B), however, in this example the first valve electrodes 61 of the valve control circuitry 60 and the first transfer electrodes 21 of the transfer circuitry 20 are provided by a single first common electrode 80 and the second valve electrode 63 of the valve control circuitry 60 and the second transfer electrode 23 of the transfer circuitry 20 are provided by a single second common electrode 82. In this example, the transfer circuitry 20 and the valve control circuitry 60 are interconnected and a single voltage generation circuitry may be used for both the transfer circuitry 20 and the valve control circuitry 60.

Figure 5A:
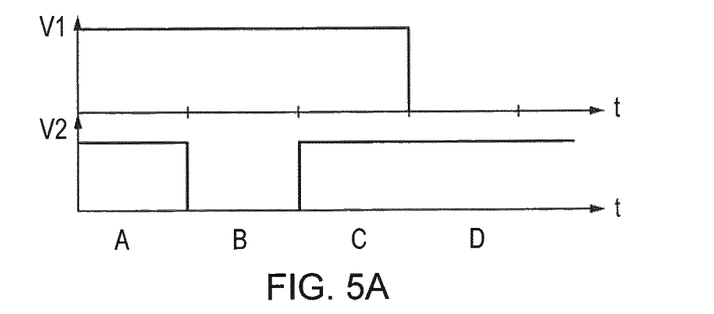
FIGS. 5A and 5B illustrate an example of operation of the transfer circuitry and the valve control circuitry.
Figure 5B:
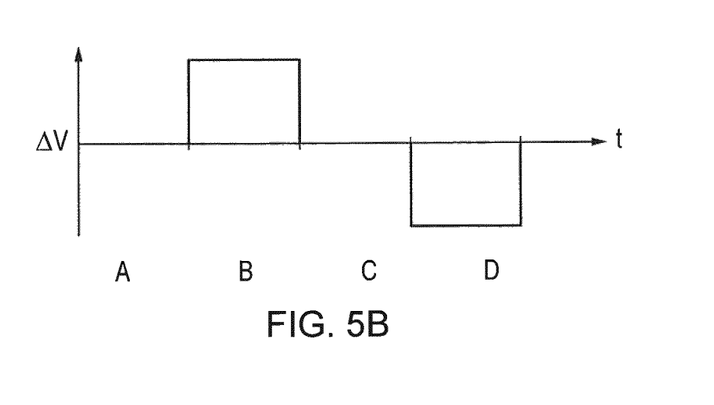

FIGS. 5A and 5B illustrate operation of the transfer circuitry 20 and the valve control circuitry 60 of the apparatus 10 illustrated in FIGS. 4A to 4D. A first voltage V1 is applied to the first common electrode 80 and a second voltage V2 is applied to the second common electrode 82. Both the first voltage V1 and the second voltage V2 are time variable. When both the first voltage V1 and the second voltage V2 have the same value there is zero potential difference between the first common electrode 80 and the second common electrode 82. When the potential difference between the first voltage V1 and the second voltage V2 has a first polarity, then the first transfer gradient 22 is generated and the valve 50 adopts the second shape 52 and opens 54 as illustrated in FIG. 4B. When the potential difference between the first voltage V1 and the second voltage V2 has a second polarity, opposite the first polarity, the second transfer gradient 24 is generated and the valve 50 adopts the second shape 52 and opens 54.

FIG. 5A illustrates the time variation of the first voltage V1 and the second voltage V2 over four different sequential time periods A, B, C, D of equal length. Each of the time periods relates to a respective one of the FIGS. 4A, 4B, 4C and 4D. FIG. 5B illustrates the potential difference (V1−V2) for each of the time sequences A, B, C, D.

During the first time period A, the first voltage V1 and the second voltage V2 are both high and the potential difference ΔV is low. There is no transfer gradient generated and the valve 50 is closed 58. During the second time period B, the first voltage V1 is high and the second voltage V2 is low. The potential difference ΔV is large and positive and the first transfer gradient 22 is generated and the valve 50 is open 54.

During the third time period C, the first voltage V1 is high and the second voltage V2 is high and the potential difference is low. There is no generated transfer gradient and the valve 50 is closed 58. During the fourth time period D, the first voltage V1 is low and the second voltage V2 is high. The potential difference ΔV is large and negative and the second transfer gradient 24 is generated and the valve 50 is open 54.

It will be appreciated from the foregoing that the valve 50 is a non-polar component and it is in an open configuration when it receives a positive potential difference and also when it received a negative potential difference.

Figure 6A:
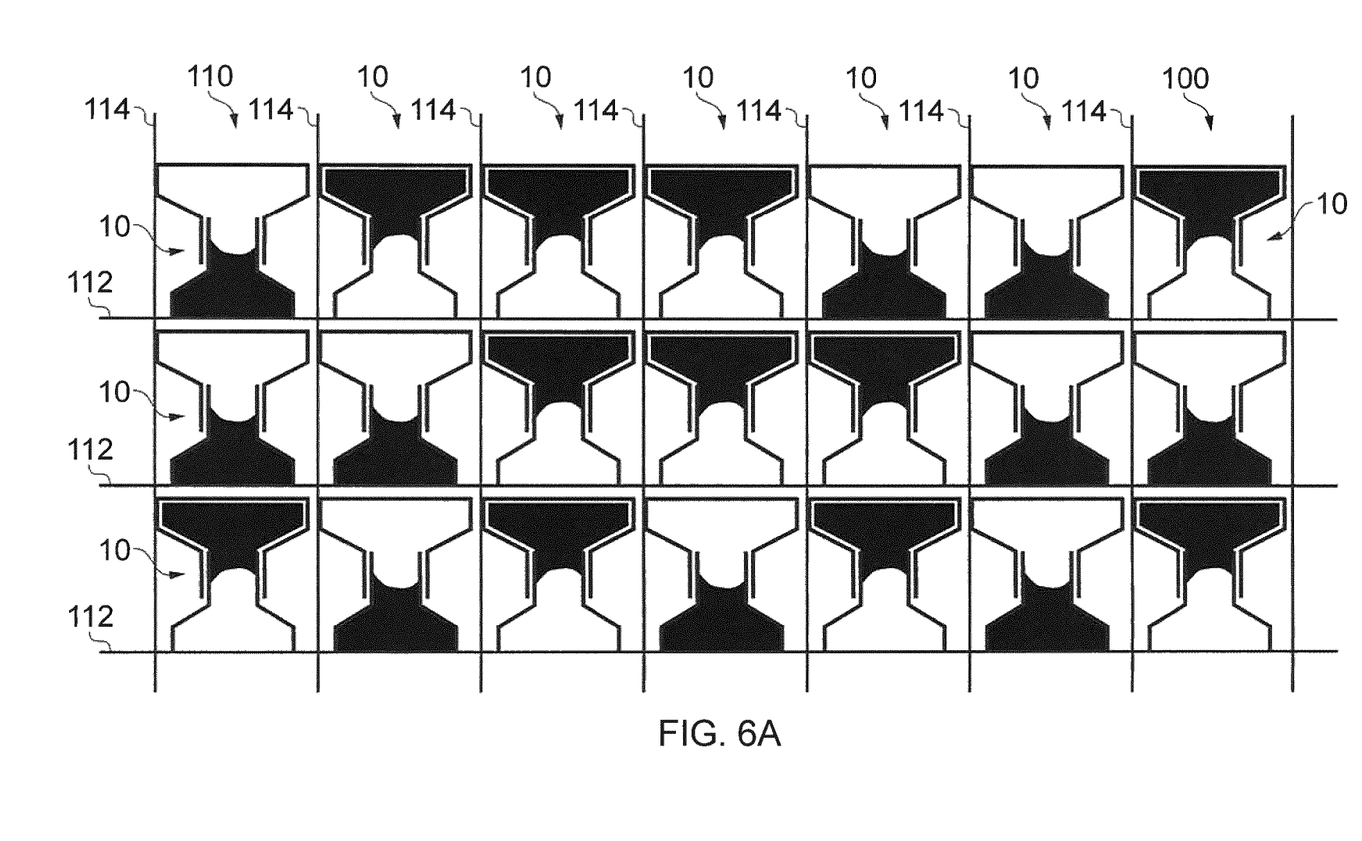
FIG. 6A illustrates an example of a display system comprising a plurality of apparatus.

FIG. 6A illustrates an example of a display system 100 comprising a plurality of apparatus 10 as previously described. The apparatus 10 are arranged in a regular array 110 comprising equally spaced rows and columns. In this example column drive lines 114 are interconnected to the first common electrode 80 of each of the apparatus 10 in a single column and row drive lines 112 are interconnected to each of the second common electrodes 82 of the apparatus 10 in a single row. It is therefore possible to generate a potential difference between the first common electrode 80 and the second common electrode 82 of a particular apparatus 10 by driving the row drive line 112 and the column drive line 114 associated with that apparatus 10.

Figure 6B:
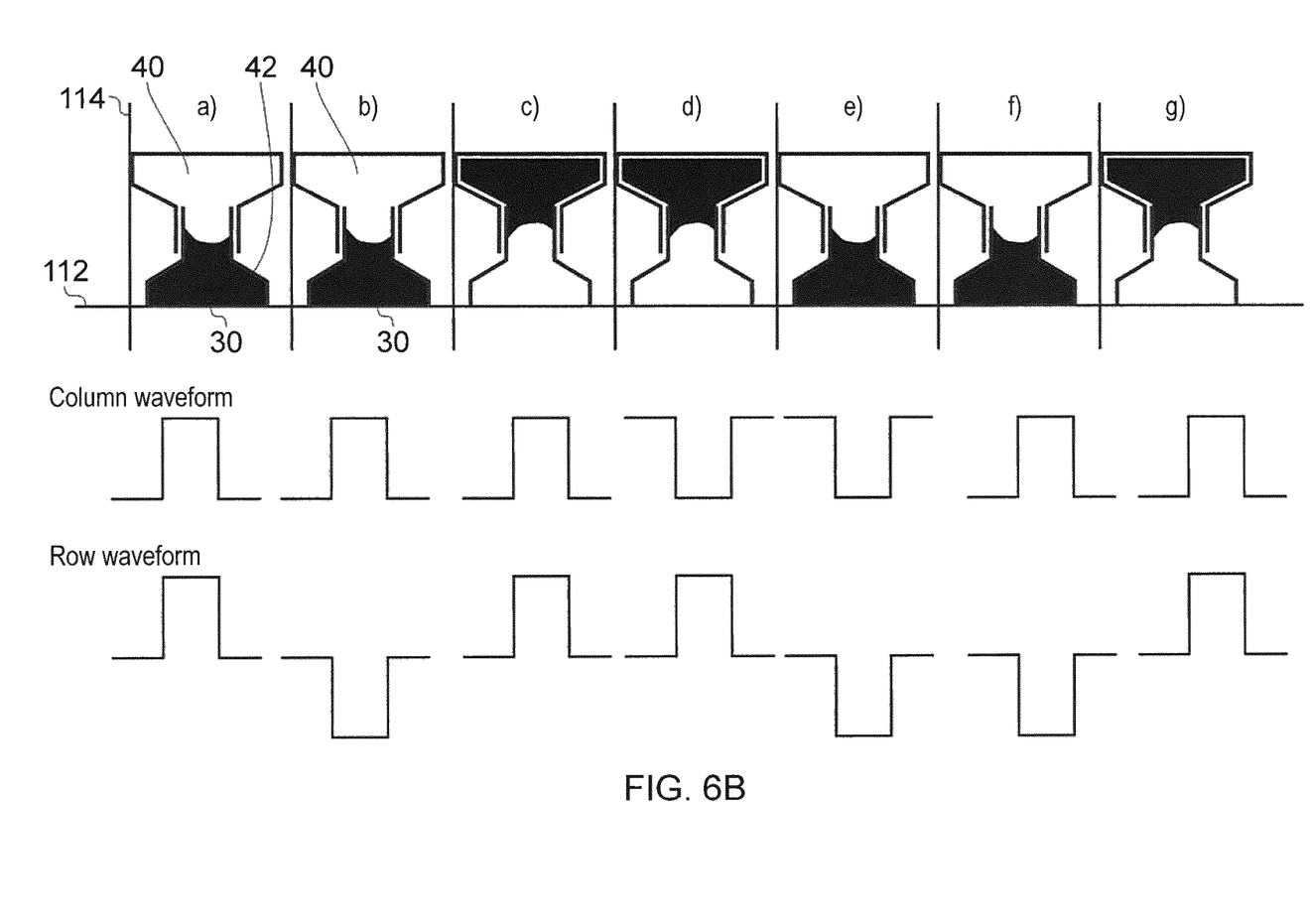
FIG. 6B illustrates a time sequence for a particular apparatus in the display system.

FIG. 6B illustrates a time sequence for a particular apparatus 10 in the display system 100. The column waveform illustrates the voltage provided to the column drive line 114 and the row waveform illustrates the voltage provided to the row drive line 112. It will be appreciated that by providing differential signals to the column drive line 114 and the row drive line 112 it is possible to transfer the optically active fluid 30 from one reservoir 40 to another reservoir 42 using a generated transfer gradient 22. It will be appreciated that when a differential voltage of a first polarity is applied between the row drive line 112 and the column drive line 114 of an apparatus 10 that the optically active fluid 30 moves from the first reservoir 40 to the second reservoir 42 via an open valve 50 along the first transfer gradient 22.

When a differential voltage of a second polarity is applied between the row drive line 112 and the column drive line 114 of an apparatus 10, the optically active fluid 30 moves from the second reservoir 42 to the first reservoir 40 via an open 54 valve 50 along the second transfer gradient 24. When there is no differential voltage between the row drive line 112 and the column drive line 114 of an apparatus 10, the valve 50 is closed 58 and the optically active fluid does not move between reservoirs.

Figure 6C:
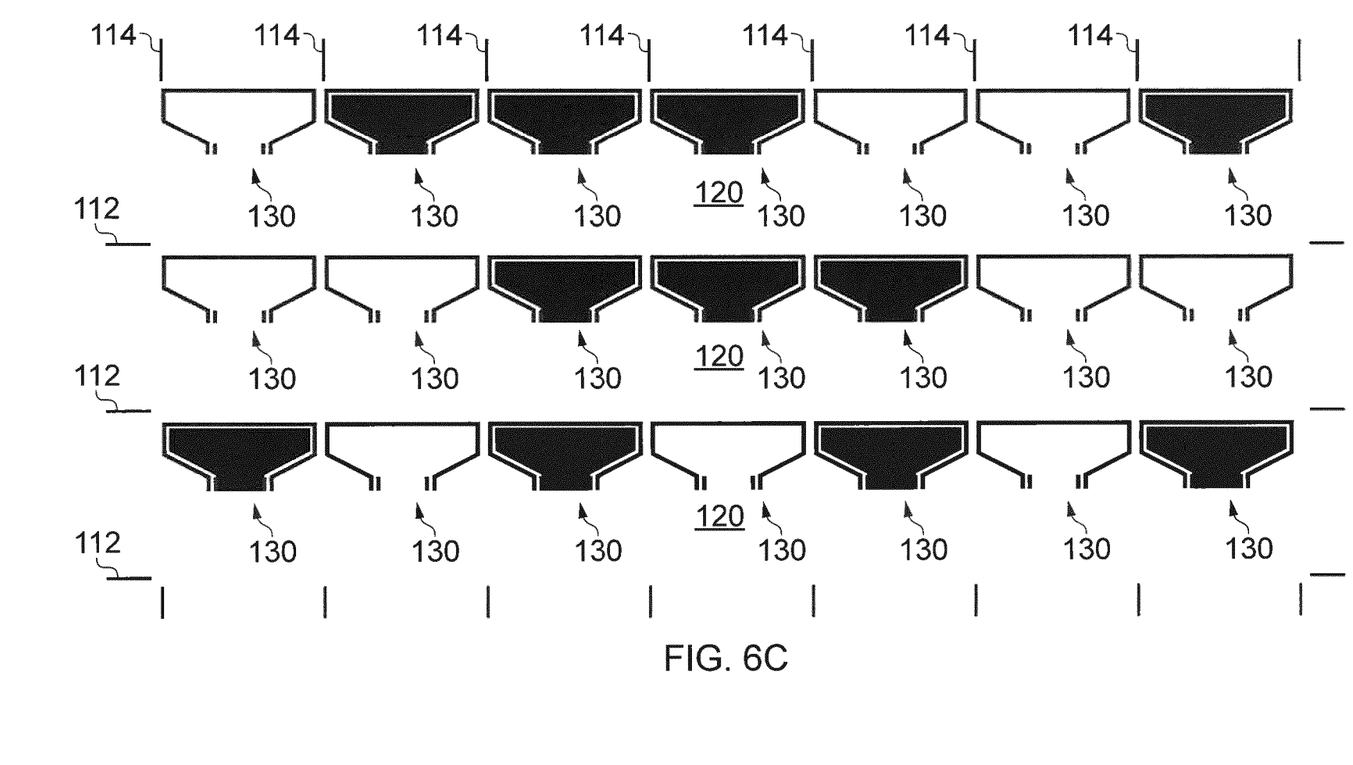
FIG. 6C illustrates the display system 100 in which reservoirs are obscured using an opaque mask.

FIG. 6C illustrates the display system 100 of FIG. 6A, in which for each apparatus 10 one of the first reservoir 40 and the second reservoir 42 is obscured using an opaque mask 120. In the illustrated example, each apparatus 10 has the same one of the first and second reservoirs obscured. In the illustrated example only the first reservoirs 40 are visible and these provide pixels or sub-pixels 130 of the display system 100. The optical characteristics, such as color, of a particular pixel or sub-pixel 130 may be controlled by moving the optically active fluid 30 from the first reservoir 40 to the second reservoir 42 and from the second reservoir 42 to the first reservoir 40.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
    transfer circuitry configured to generate electrically a first transfer gradient for transferring an optically active fluid from a first reservoir to a second reservoir, wherein the transfer circuitry is configured to control a first transfer electrode associated with the first reservoir and a second transfer electrode associated with the second reservoir;
    a valve configured to control transfer of the optically active fluid from the first reservoir to the second reservoir, wherein the valve is closed when it has a first shape and the valve is open when it has a second shape different from the first shape; and
    valve control circuitry configured to provide a voltage to change the valve from the first shape to the second shape and open the valve facilitating transfer of the optically active fluid from the first reservoir to the second reservoir along the electrically generated first transfer gradient;
    wherein the valve control circuitry comprises at least a first pair of overlapping valve electrodes adjacent a first sidewall of a conduit extending between the first reservoir and the second reservoir, wherein the first pair of valve electrodes comprises a first valve electrode and a second valve electrode separated from the first valve electrode in a direction perpendicular to the first transfer gradient.

2. An apparatus as claimed in claim 1, wherein the transfer circuitry is configured to generate electrically a second transfer gradient for transferring the optically active fluid from the second reservoir to the first reservoir, wherein the valve is configured to control transfer of the optically active fluid from the second reservoir to the first reservoir, and wherein the valve control circuitry is configured to provide a voltage to change the valve from the first shape to the second shape and open the valve facilitating transfer of the optically active fluid from the second reservoir to the first reservoir along the electrically generated second transfer gradient.

3. An apparatus as claimed in claim 1, wherein the valve is configured to have, by default, the first shape.

4. An apparatus as claimed in claim 1, wherein the valve comprises an electromechanical gel.

5. An apparatus as claimed in claim 4, wherein the valve control circuitry is configured to provide a voltage, to open the valve, in a direction perpendicular to the first transfer gradient to deform the electromechanical gel.

6. An apparatus as claimed in claim 1, wherein the valve controls flow of the optically active fluid through the conduit, wherein the conduit is blocked when the valve has the first shape and wherein the conduit is not blocked when the valve has the second shape.

7. An apparatus as claimed in claim 6, wherein the transfer circuitry comprises circuitry configured to generate a voltage of a first polarity between the first and second electrodes to generate electrically the first transfer gradient and configured to generate a voltage of a second polarity, opposite the first polarity, between the first and second electrodes to generate electrically a second transfer gradient, opposite the first transfer gradient.

8. An apparatus as claimed in claim 6, wherein the valve control circuitry comprises at least a first valve electrode associated with the conduit, at least a respective second valve electrode associated with the conduit and circuitry configured to generate a voltage between the first and second valve electrode perpendicular to the first transfer gradient to deform an electromechanical gel to the second shape wherein the electromechanical gel is preferentially drawn adjacent at least portions of sidewalls of the conduit creating a fluid passage through the conduit.

9. An apparatus as claimed in claim 6, wherein the first reservoir, the second reservoir and the conduit form a sealed system of fixed shape and volume for the optically active fluid without additional reservoirs.

10. An apparatus as claimed in claim 1, wherein the transfer circuitry and the valve control circuitry operate independently.

11. An apparatus as claimed in claim 1, wherein the transfer circuitry and the valve control circuitry are interconnected and a single voltage generation circuitry is used for both the transfer circuitry and the valve control circuitry.

12. An apparatus as claimed in claim 1 wherein the optically active fluid comprises one or more of a plurality of immiscible liquids having different optical properties that share the same volume.

13. A display system comprising a plurality of apparatus as claimed in claim 1 arranged in a regular array of rows and column, wherein each apparatus has a first reservoir exposed and a second reservoir concealed, the first reservoirs providing pixels or sub-pixels of the display system.

14. A method comprising:
providing one or more voltages to generate a first transfer gradient for transferring an optically active fluid from a first reservoir to a second reservoir, by controlling a first transfer electrode associated with the first reservoir and a second transfer electrode associated with the second reservoir, and to open a valve to facilitate transfer of the optically active fluid from the first reservoir to the second reservoir along the electrically generated first transfer gradient, wherein the valve is closed when it has a first shape and the valve is open when it has a second shape different from the first shape; removing the one or more voltages to remove the first transfer gradient and close the valve, wherein valve control circuitry comprises at least a first pair of overlapping valve electrodes adjacent a first sidewall of a conduit extending between the first reservoir and the second reservoir, wherein the first pair of valve electrodes comprises a first valve electrode and a second valve electrode separated from the first valve electrode in a direction perpendicular to the first transfer gradient.

* * * * *